United States Patent [19]
McQueen, II et al.

[11] Patent Number: 5,590,907
[45] Date of Patent: Jan. 7, 1997

[54] SEAT BELT POSITIONING DEVICE AND SYSTEM

[75] Inventors: Erwin S. McQueen, II, Beverly Hills; Ervin R. Pilarczyk, Ocala, both of Fla.

[73] Assignee: Vehicle Safety Systems, Inc., Ocala, Fla.

[21] Appl. No.: 541,604

[22] Filed: Oct. 10, 1995

[51] Int. Cl.⁶ ................................................. A62B 35/00
[52] U.S. Cl. .................... 280/801.1; 280/808; 297/483
[58] Field of Search ........................... 280/801.1, 801.2, 280/808, 807; 297/468, 474, 483

[56] References Cited

U.S. PATENT DOCUMENTS

| | | | |
|---|---|---|---|
| 4,974,876 | 12/1990 | Svenssen et al. | 280/801.1 X |
| 4,979,764 | 12/1990 | Drinane et al. | 280/808 |
| 4,989,901 | 2/1991 | Adomeit | 280/801.2 X |
| 5,176,403 | 1/1993 | Klein et al. | 280/808 |
| 5,219,207 | 1/1993 | Anthony et al. | 297/473 |
| 5,397,152 | 3/1995 | Kawamura | 280/807 |

*Primary Examiner*—Christopher P. Ellis
*Attorney, Agent, or Firm*—Dominik & Stein

[57] ABSTRACT

A device for automatically positioning a shoulder harness of a vehicle retractable seat belt for maximum fit and comfort of a vehicle occupant regardless of the body size of the occupant, and including a shoulder harness positioning guide for automatically positioning the shoulder harness of the safety belt over the torso of a seat occupant, wherein the guide is provided adjacent the retractor mechanism and provides at least a convex guide surface over which the shoulder harness is fed out during deployment, the convex guide surface being wider than the width of the safety belt webbing, the convex guide surface having an upper end and a lower end, such that during deployment of the safety belt the movement of the safety belt tongue plate over a lower path causes the shoulder harness to be deployed from the lower end of the convex guide surface, and movement of the safety belt tongue plate over a higher path causes the shoulder harness to be deployed from the upper end of the convex guide surface.

8 Claims, 4 Drawing Sheets

SEAT BELT POSITIONING DEVICE AND SYSTEM

BACKGROUND OF THE INVENTION

1. Field of the Invention

The present invention relates to a device for positioning a retractable seat belt, and more particularly, to a device for automatically positioning a shoulder harness of a vehicle retractable seat belt for maximum fit and comfort of a vehicle occupant regardless of the body size of the occupant, and to a system utilizing the device to simply and automatically adjust the seat belt.

2. Description of the Related Art

A conventional three-point seat belt restraint system is comprised of a lap belt segment and a shoulder harness segment. One end of a length of seat belt webbing is affixed to a vehicle frame structure on one side of the passenger seat, either near or on the vehicle floor, by a first anchor mount. The other end is attached to a seat belt retractor which is mounted on or near the vehicle roof on the same side of the passenger seat as the first anchor mount. The seat belt is provided with an adjustable tongue plate adapted for locking engagement with a seat belt buckle which is anchored on the opposite side of the passenger seat as the first seat belt anchor mount and the retractor. The belt webbing between the first anchor mount and tongue plate crosses over the lap of the passenger, and is thus referred to as the "lap belt" segment of the seat belt. The belt webbing between the tongue plate and retractor comes from behind, over the shoulder, and falls diagonally across the upper torso of the vehicle occupant, and is thus referred to as the "shoulder harness" segment of the seat belt.

The comfort and effectiveness of a shoulder harness depends, in large part, on where the harness is positioned on the vehicle occupant's torso. However, a conventional seat belt system is designed to accommodate only one size passenger, this being an adult passenger of average height. A shoulder harness arrangement of such dimensions may not be comfortable when applied over a smaller passenger. If the shoulder harness dimensioned for an adult is worn by a smaller passenger and is not correctly positioned, the shoulder harness ceases to be a safety device and may even increase the risk of serious injury to the passenger during a vehicular collision. Further, considering human nature, if the harness is not comfortable there is a tendency for the passenger not to wear the seat belt in the manner in which it is designed to be worn (i.e., the shoulder harness may be moved behind the back), thus preventing the seat belt from properly performing its function as an upper torso restraining device. Accordingly, comfort is a very important design feature.

Despite the importance of correct positioning of the shoulder harness, most conventional seat belt restraint systems provided in vehicles today do not provide any way for automatically accommodating the shoulder harness to individuals of different sizes.

Various attempts have been made in the past to render conventional shoulder harnesses adjustable, but these attempts have proven to be less than optimal solutions to the problem. For example, U.S. Pat. No. 4,893,835 to Linden discloses a deflection device for shortening the length of the shoulder belt portion in order to position it across the chest of a smaller seat occupant such as a child. However, this device is only useful for seat belts having not only the lap belt segment and the shoulder harness segment, but also an additional vertical run of webbing along the door post below the upper anchor point of the shoulder belt segment anchoring point. Further, this system requires the seat belt to be manually adjusted each time the size of the vehicle occupant changes. Further yet, the device may interfere with the retraction mechanism. U.S. Pat. No. 4,796,919 to Linden likewise teaches a deflection device for shortening the length of the shoulder belt portion and disposing it across the chest of a smaller seat occupant such as a child. This device is not automatic, and can only be used in seat belt systems including a vertical run of seat belt webbing below the door post anchorage of the shoulder belt.

U.S. Pat. No. 4,799,737 to Greene teaches an auxiliary shoulder belt adjuster which will permit the shoulder belt of a conventional vehicular restraint system to be adjusted in accordance with the height requirements of a seated individual. The auxiliary adjusting device has a first, upper, attachment point for adjusting the seat belt for a conventional adult sized individual and a second, lower, attachment point for adjusting the belt for shorter individuals. However, due to the reliance on secondary anchoring points away from the main seat belt anchoring points, the device appears to reduce the load bearing capacity of the belt. Further, the device is not automatic, but must be adjusted each time the size of the passenger changes.

U.S. Pat. No. 5,255,940 to Kornblum et al. teaches an add-on device for repositioning the shoulder restraint belt to make it adjustable for the comfort and safety of the user. However, the device is liable to the same deficiencies as discussed above.

U.S. Pat. No. 5,340,198 to Murphy et al. also teaches a safety belt adjustment device for lowering the point at which the shoulder harness crosses the center of the passenger's chest. The device is not automatic and is liable to the deficiencies discussed above.

U.S. Pat. No. 5,074,589 discloses an automatic seat belt wherein the lap seat belt and shoulder seat belt are automatically set to restrain a seated person. A first end of each belt is slidable in a guide rail diagonally disposed on the inner surface of the door. Second ends of the belts are fixed on the inner side of the seat bottom and on the inner portion of the seat back respectively. When the first ends of the seat belts are in the highest position of the guide rail, the seated person is in a free state. When the first ends are slid and set in the lowest position, the seat belts restrain the person. The construction cost of such a system is prohibitive to the small manufacturer.

Due to the importance of shoulder harness fit, the Department of Transportation, National Highway Traffic Safety Administration (NHTSA) has investigated the problem and is proposing new requirements which will render the above-discussed positioning devices obsolete. NHTSA's research indicated that a significantly lower percentage of both non-adjustable and adjustable belts were within the comfort zone for the six-year-old dummy than for the adult dummies. As set forth in 49 CFR Part 571 [Docket No. 74-14; Notice 91]; RIN 2127-AE48; Federal Motor Vehicle Safety Standards; Occupant Crash Protection published Aug. 3, 1994, NHTSA found that some vehicle occupants who find their safety belts to be uncomfortable react to their discomfort either by wearing their safety belts incorrectly or by not wearing them at all. NHTSA considered that improving safety belt fit will encourage the correct use of safety belts usage rate, and thus proposes to amended Standard No. 208. Occupant Crash Protection, to require that Type 2 safety belts installed for adjustable seats in vehicles to either be integrated with the vehicle seat or be equipped with a means of adjustability to improve the fit and increase the comfort of the belt for a variety of different sized occupants by 1997.

Although the need was obvious, an economical, simple design which could satisfy the requirements was not so obvious. Proposed designs included the following:

An adjustable upper anchorage device (AUA) which provides a means of adjusting the upper anchorage of the shoulder belt and which has at least two distinct positions separated by at least 5 centimeters, measured linearly. However, such a device adds mechanical complexity and cost.

A floor-mounted inboard adjustable anchorage which is similar to the AUA but is mounted on the floor on the inboard side of the seat. This device must have at least two distinct adjustment positions for moving the device or webbing at least 5 centimeters, measured linearly. Again, the mechanical complexity increases cost, and the moveability of the floor mount reduces load bearing capacity.

An integrated safety belt assembly which is anchored completely to the seat structure. For a moveable seat, the anchorages must be located on a part of the seat above the seat adjuster. Such a design increases cost.

A "semi-integrated" safety belt assembly which has the upper anchorage and the retractor for the upper torso portion of the Type 2 belt mounted to the moving portion of the seat structure. Other similar "semi-integrated" designs include: lower anchorages for the upper torso belt mounted on the movable portion of the seat; shoulder belt guides; and through-the-seat routing of the safety belt webbing. The movement of the device, measured linearly, must be at least 5 centimeters. Again, design and construction costs would increase.

Sling-mounted D-rings comprising an upper shoulder belt anchorage D-ring, used to relocate the D-ring closer to the occupant. The sling usually rotates freely around the anchorage bolt to permit D-ring movement. Sling-mounted D-rings designed in this manner do not have two distinct adjustment positions and would not comply with the adjustability requirement. NHTSA indicated that it does not believe that a sling-mounted D-ring which does not have district adjustment positions should be allowed as the position of such a device would change due to vehicle vibration or occupant movement, resulting in reduced comfort for the occupant.

An international seat retractor is a safety belt retractor that would permit the introduction of slack in the upper torso portion of the safety belt. Such a device could not be used to comply with the new NHTSA requirement.

An example of the type of design that would meet the requirement of S7.1.2.1 is a Volvo design in which the shoulder belt webbing is fed through a slot in the pillar at different angles and in different locations as increasing amounts of webbing are spooled off the conical spool of the retractor. This design is mechanically complicated and expensive. Increased mechanical complexity introduces the possibility of mechanical failure.

Porsche described a system which adjusts the seat height relative to a fixed D-ring to be used to comply with the adjustability requirement. NHTSA is not amending the language to allow the use of this system as a means of compliance, since occupants use seat adjustability primarily as a means of reaching controls and increasing visibility out of the vehicle.

The above relates mainly to adjustable front seats. NHTSA received comments from manufacturers indicating that there were greater design problems with designing rear seats to comply with the adjustability requirement, and that compliance was costlier for these seats with little benefits.

Thus, it becomes apparent that there exists a real need for a simple and economical device for automatically adjusting a shoulder harness of a vehicle retractable seat belt for maximum comfort of a vehicle occupant regardless of the body size of the occupant, and to a system utilizing the device to simply and automatically adjust the shoulder harness.

There is a need for a device and system which can automatically adjust a shoulder harness for an occupant of a fixed rear seat as well as for a moveable front seat.

There is also a need for a device and system which utilizes lighter weight components, is relatively simple in design and construction, inexpensive to fabricate and assemble, and yet is durable and highly reliable.

SUMMARY OF THE INVENTION

After extensive investigation and experimentation, the present inventors have has discovered that the objects of the invention can be simply, eloquently, and inexpensively accomplished by a shoulder harness automatic positioning system comprising a safety belt, a retractor mechanism, and a shoulder harness positioning guide for automatically positioning the shoulder harness of the safety belt over the torso of a seat occupant, wherein the guide is provided adjacent the retractor mechanism and provides at least a convex guide surface over which the shoulder harness is fed out during deployment, the convex guide surface being wider than the width of the safety belt webbing, the convex guide surface having an upper end and a lower end, such that during deployment of the safety belt the movement of the safety belt tongue plate over a lower path causes the shoulder harness to be deployed from the lower end of the convex guide surface, and movement of the safety belt tongue plate over a higher path causes the shoulder harness to be deployed from the upper end of the convex guide surface.

Obviously, a smaller vehicle seat occupant such as a child will deploy the safety belt by moving the safety belt tongue plate over a lower path in order to lock the tongue plate into the seat belt buckle. This will cause the shoulder harness to be deployed from the lower end of the convex guide surface, thereby automatically causing the shoulder harness to be positioned lower on the torso and thus comfortably on the child. On the other hand, an adult will deploy the seat belt by moving the safety belt tongue plate over a higher path. This will cause the shoulder harness to be deployed from the upper end of the convex guide surface, and thus be automatically positioned in the comfort zone of the adult.

The shoulder harness guide thus allows the harness to be automatically and properly positioned on passengers of varying sizes. Since the shoulder harness is automatically positioned, the passenger is not required to make complicated adjustments in order to properly position the harness. Accordingly, the seat belt deployment system of the present invention ensures maximal effectiveness and level of comfort without significant design or construction complexity or cost, The foregoing has outlined rather broadly the more pertinent and important features of the present invention in order that the detailed description of the invention that follows may be better understood and so that the present contribution to the art can be more fully appreciated, Additional features of the invention will be described hereinafter which form the subject of the claims of the invention, It should be appreciated by those skilled in the art that the conception and the specific embodiments disclosed may be readily utilized as a basis for modifying or designing other vehicle safety belt deployment systems for carrying out the same purposes of the present invention, It should also be realized by those skilled in the art that such equivalent structures do not depart from the spirit and scope of the invention as set forth in the appended claims,

BRIEF DESCRIPTION OF THE DRAWING

For a fuller understanding of the nature and objects of the present invention reference should be made the following detailed description taken in with the accompanying drawings in which.

DETAILED DESCRIPTION OF THE INVENTION

The restraint system with which the present invention may be utilized may be any vehicle restraint including a shoulder harness and a seat belt retractor mechanism, and will be discussed hereafter using a conventional three point seat belt system by way of non-limiting illustration. Such as system is disclosed in, for example, U.S. Pat. No. 5,265,909, the contents of which are incorporated herein by reference. This patent discloses a seat belt anchorage system for conversion vans. The system includes reinforcement of the upper frame rails of the van and includes seat belt bars connected to the floor of the van. The seat belt bars are attached to frame locking reinforcement members beneath the floor, which in turn engage the chassis frame rails of the van. Seat belt and shoulder harness assemblies are connected to the reinforcements on the upper free rails and to the seat belt bars.

In many vehicles the safety belt retractor is mounted either on a roof rail, or is mounted elsewhere but fed out over a seat belt guide which is anchored on or near a roof rail. The present invention is applicable to any such system.

In a preferred embodiment of the invention the retractor mounts up under the header and fits flush in the vehicle, i.e., so that the retractor is hidden behind the interior paneling or trim. By providing the retractor over the shoulder or over the head of the occupant rather than on the floor, deployment becomes more efficient since there is less drag. Further, since there is less webbing, the ability of the safety belt to restrain the occupant is enhanced since the webbing stretch is 8% when loaded. Thus, any system involving less safety belt webbing results in better containment of the occupant.

The present invention is particularly of interest in the van conversion industry, since many van occupants complain about the safety belt being tight on the neck. Besides providing the necessary automatic adjustment for safety and comfort, the system of the present invention when installed in a conversion van looks extremely clean.

Normally the shoulder harness positioning device of the present invention is provided at an angle of approximately 10°–15°, preferably about 13°, off vertical but depending mainly upon the specific retractor used, the seat position, and the contour of the wall. Each vehicle has a unique wall panel angle so the mounting bracket is bent to compensate. The bracket for the right side of the vehicle will be a mirror image of the bracket for the left side of the vehicle.

The invention will now be discussed by reference to the specific illustrative embodiment shown in the figures.

Figure 1:
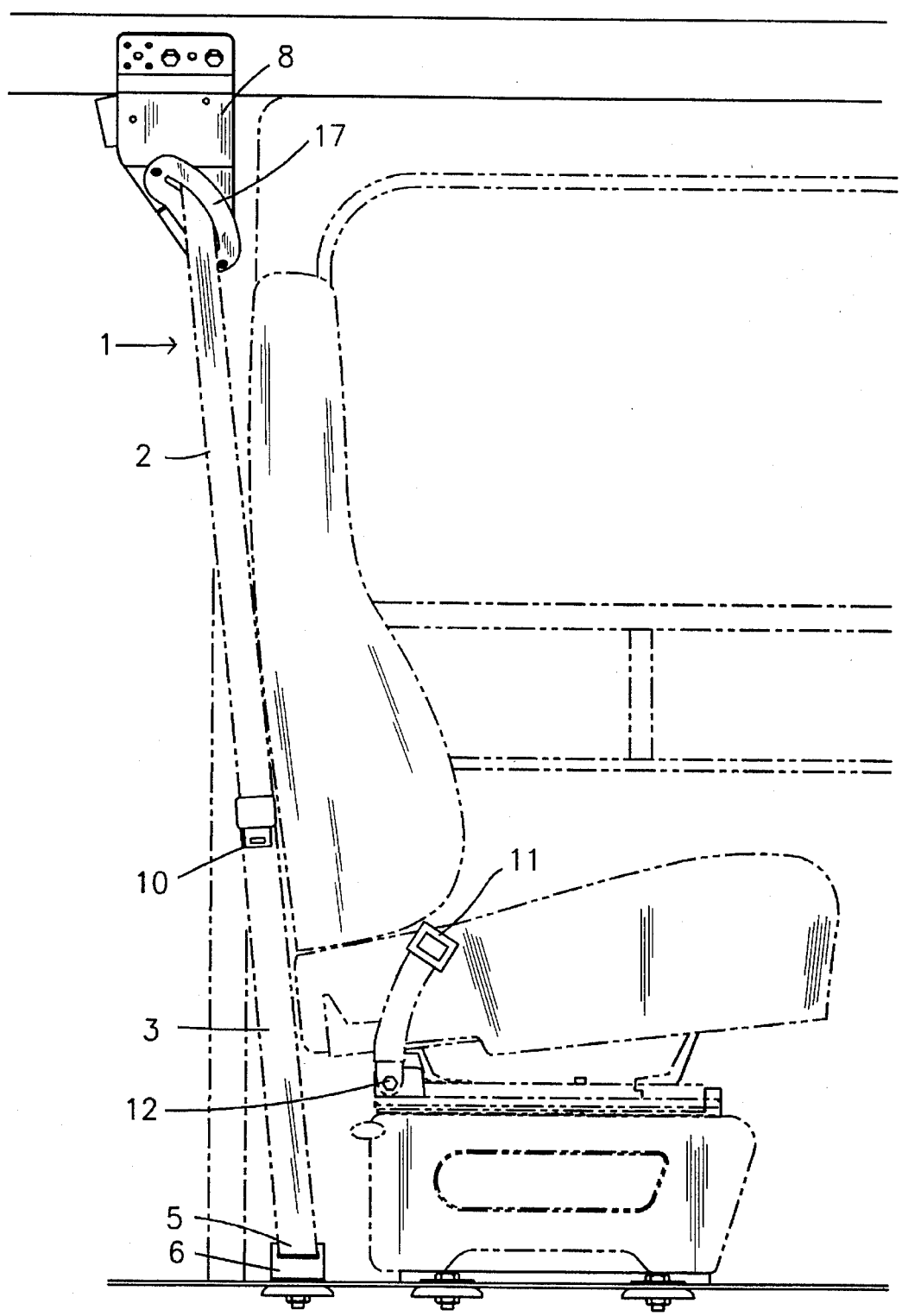
FIG. 1 is a side view of the seat belt deployment system installed in a vehicle.
Figure 4:
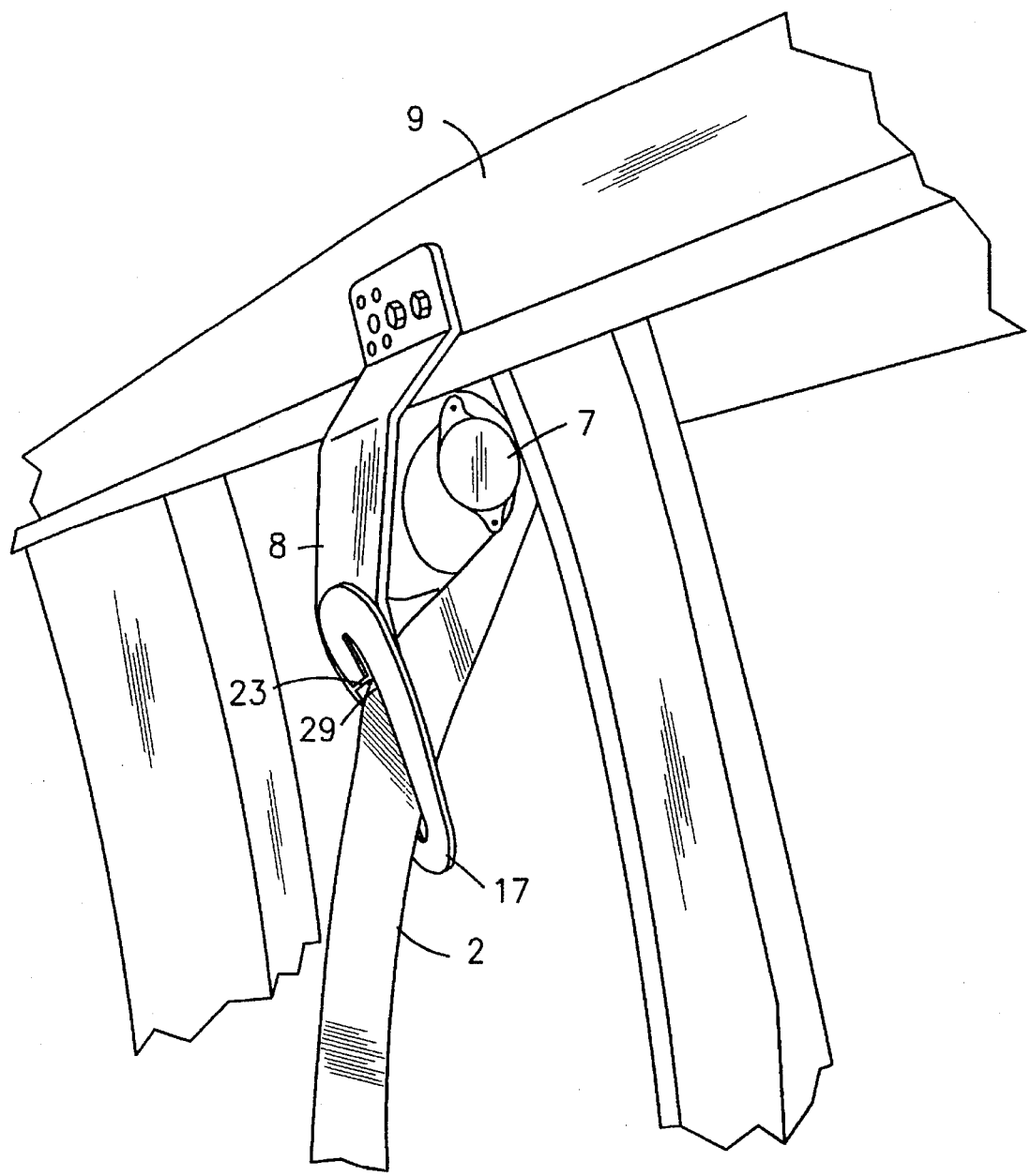
FIG. 4 is a perspective view showing a shoulder harness fed from a retractor mechanism and through a guide plate.

FIG. 1 shows a conventional three-point seat belt restraint system 1 wherein the seat belt webbing is comprised of a lap belt segment 3 and a shoulder harness segment 4. A first end 5 of the seat belt webbing is affixed to a vehicle frame structure (not shown) on one side of the passenger seat, either near or on the vehicle floor, by a first anchor mount 6. The other end is attached to a seat belt retractor 7 as shown in FIG. 4. The retractor is mounted on a mounting plate 8 which is mounted on or near the vehicle roof, preferably on a frame rail 9, on the same side of the passenger seat as the first anchor mount 6. The seat belt 1 is provided with an adjustable tongue plate 10 adapted for locking engagement with a seat belt buckle 11 which is anchored via anchor mount means 12 on the opposite side of the passenger seat as the first seat belt anchor mount 6 and the retractor 7. The belt webbing 3 between the first anchor mount 6 and tongue plate 10 crosses over the lap of the passenger when deployed, and is thus referred to as the "lap belt" segment of the seat belt. The belt webbing 2 between the tongue plate 10 and retractor 7 comes from behind over the shoulder falls diagonally across the upper torso of the vehicle occupant, and is thus referred to as the "shoulder harness" segment of the seat belt.

Figure 2:
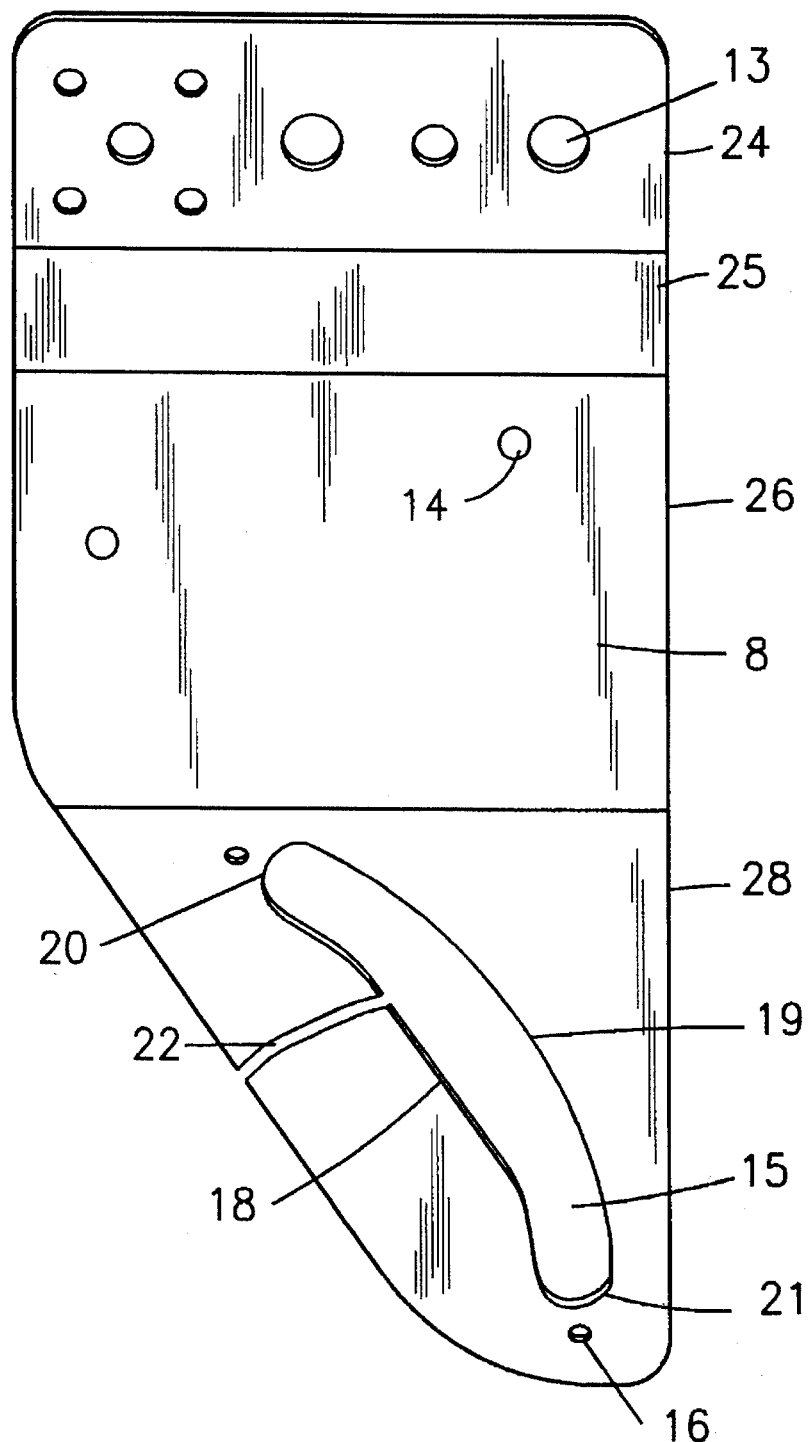
FIG. 2 is a side view of the attachment plate which is attached to the roof of the vehicle and on which the shoulder harness positioning guide and the retractor mechanism are attached.

As seen in FIG. 2, the mounting plate 8 is provided with bore holes for mounting the mounting plate 8 to the vehicle roof or other structurally strong anchoring point. The plate 8 is also provided with bore holes 14 for mounting the retractor mechanism 7. The mounting plate is provided with an arc-shaped opening 15 having a convex edge 18, a concave edge 19, an upper edge 20, and a lower edge 21. In order to improve the ease of deployment of the safety belt webbing through the arc-shaped opening 15, a plastic or synthetic polymer grommet 17 having good slip characteristics is provided in arc-shaped opening 15. In order to provide good adjustability characteristics, the length of the arc of the arc-shaped opening is preferably at least 5 cm longer than the width of the vehicle safety belt webbing. In order to simplify the assembly and repair processes, the mounting plate 8 and grommet 17 are preferably provided with slits 22, 23 through which the seat belt webbing can be passed.

Figure 3:
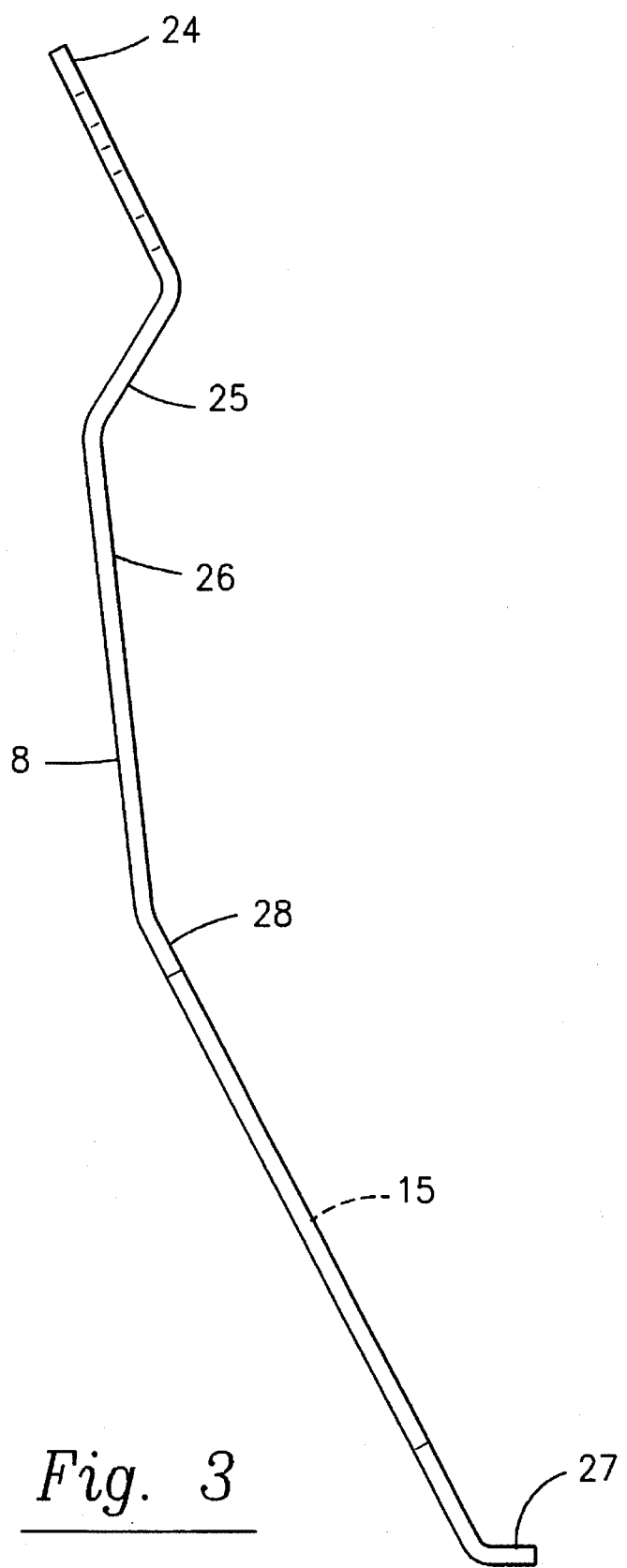
FIG. 3 is a front profile view of the attachment plate shown in FIG. 2.

The specific shape of the mounting plate 8 is not limited, and may be any shape so long as it provides for secure mounting of the seat belt retractor 7 and can be securely mounted to the vehicle framework 9. One example of a shape of a mounting bracket 8 which is designed for a particular vehicle is shown in FIGS. 2 and 3. Bracket 8 is comprised of an upper mounting segment for mounting to the roof rails of the vehicle. The next adjacent segment 25 provides lateral separation between the retractor mounting segment 26 and the outer wall of the vehicle (not shown). The angle of the retractor mounting segment 26 with respect to vertical is not particularly limited, so long as the interaction of the mounted retractor 7, the grommet 17, and the vehicle occupant results in the desired automatic positioning effect.

Accordingly, in designing the automatic shoulder harness positioning system, it is necessary to take into consideration the position of the retractor 7 and the seat belt buckle 11, and to provide the mounting plate arc-shaped opening 15 and optionally grommet 17 in such a position that the convex edge 18 of the arc-shaped opening 15 or the convex edge 29 of grommet 17 is between he seat belt buckle 11 and retractor 7.

It is believed that the manner in which the vehicle seat assembly according to the present invention is constructed and utilized will be readily apparent from the foregoing description, but the following detailed description will serve to further explain various and preferred modes of construction and utilization.

The system takes advantage of the tendency of the seat belt to want to slide over that part of the arc shaped opening which represents the shortest distance between two points. Accordingly, a smaller vehicle seat occupant such as a child will deploy the safety belt by moving the safety belt tongue plate 10 over a lower path in order to lock the tongue plate 10 into the seat belt buckle 11. This will cause the shoulder harness 2 to be deployed from the lower end 21 of the convex guide surface, thereby automatically causing the shoulder harness to be positioned lower on the torso and thus comfortably on the child.

On the other hand, an adult will deploy the seat belt by moving the safety belt tongue plate 10 over a higher path. This will cause the shoulder harness 2 to be deployed from the upper end 20 of the convex guide surface, and thus be automatically positioned in the comfort zone of the adult.

The shoulder harness guide thus allows the harness to be automatically and properly positioned on passengers of varying sizes. Since the shoulder harness is automatically positioned, the passenger is not required to make complicated adjustments in order to properly position the harness. Accordingly, the seat belt deployment system of the present invention ensures maximal effectiveness and level of comfort without significant design or construction complexity or cost.

In the most preferred embodiment of the invention the convex surface 18 of the arch-shaped opening 15 faces forward, and any arrangement could be made to work so long as the "shortest distance between two points" principle is adhered to.

The remaining components of the safety belt system are well known and need not be described herein in detail. For example, a spool-type belt retractor equipped with a pendulum-type inertia-sensitive locking mechanism is disclosed in U.S. Pat. No. 5,121,887 to Schmidt et al. Mounting hardware for anchoring the seat belt are well known.

A system for automatically positioning a safety belt including similar structural components is disclosed in U.S. Pat. No. 5,149,135 to Konishi et al. Konishi et al. (Konishi), the disclosure of which is incorporated herein by reference. Konishi shows a seat belt adjusting guide including a bezel 21 with an arcuate hole 22 mounted on the front and upper portion of the vehicle rear door. The seat belt 3 or support strap 5 passes through the bezel 21 and is taken up by retractor 28 mounted inside the rear door. However, in Konishi the seat belt retractor is located in the base of the seat, and the arcuate hole is provided in order that when the rear door is pivotally moved outwardly to be opened, the seat belt (or a support strap) is moved forwardly and upwardly in the hole. When the front seat is reclined backwards, the support strap is moved rearwardly and downwardly (column 7, lines 32 et seq.). The seat belt is fed out over the concave edge of the arcuate hole. The seat belt guide arrangement disclosed in Konishi does nothing to properly automatically position the shoulder harness on various sized restrained passengers.

Additional patents disclosing safety belt hardware which can be used in the present invention include U.S. Pat. RE 34,051, U.S. Pat. No. 5,076,608, and U.S. Pat. No. 5,149,135.

Although the system was first designed for providing automatic positioning of a shoulder harness segment of a vehicle safety belt, and thus is particularly suited for front or rear seats, fixed or moveable seats, of an automobile, it will be readily apparent that the system is capable of application to related vehicles, such as boats and airplanes, and is thus capable of use in a number of other applications. Although this invention has been described in its preferred form with a certain degree of particularity with respect to automobiles, it is understood that the present disclosure of the preferred form has been made only by way of example and that numerous changes in the details of structures and the composition of the system may be resorted to without departing from the spirit and scope of the invention.

Now that the invention has been described,
What is claimed is:

1. A vehicle safety belt shoulder harness automatic positioning system comprising:

a mounting plate mounted on or near the roof of said vehicle, a safety belt retractor mechanism mounted on said mounting plate, a safety belt attached at one end on or near the vehicle floor and at another end to said safety belt retractor mechanism, a seat belt buckle mounted to the vehicle, and an adjustable tongue plate provided on said safety belt, said tongue plate adapted for locking engagement with said seat belt buckle, the segment of the seat belt above the tongue plate forming the shoulder harness segment of the seat belt, wherein said mounting plate is provided with a convex guide surface over which said shoulder harness is fed during deployment, said convex guide surface being positioned relative to said retractor mechanism and said seat belt buckle such that during deployment of said safety belt the movement of said safety belt tongue plate over a first, lower path causes the shoulder harness to be deployed from the lower end of the convex guide surface, and movement of the safety belt tongue plate over a second, higher path causes the shoulder harness to be deployed from the upper end of the convex guide surface.

2. An automatic positioning system as in claim 1, wherein said convex guide surface is wider than the width of the safety belt webbing.

3. A vehicle safety belt shoulder harness automatic positioning system comprising:

a mounting plate mounted on or near the roof of said vehicle, a safety belt retractor mechanism mounted on said mounting plate, a safety belt attached at one end on or near the vehicle floor and at another end to said safety belt retractor mechanism, a seat belt buckle mounted to the vehicle, and an adjustable tongue plate provided on said safety belt, said tongue plate adapted for locking engagement with said seat belt buckle, the segment of the seat belt above the tongue plate forming the shoulder harness segment of the seat belt, wherein said mounting plate is provided with a convex guide surface over which said shoulder harness is fed during deployment, wherein said guide plate is provided with a concave surface opposing said convex guide surface and defining an arcuate aperture in said guide plate, said arcuate aperture having an upper end and a lower end, said arcuate aperture being positioned relative to said retractor mechanism and said seat belt buckle such that during deployment of said safety belt the movement of said safety belt tongue plate over a first, lower path causes the shoulder harness to be deployed from the lower end of the convex guide surface, and movement of the safety belt tongue plate over a second, higher path causes the shoulder harness to be deployed from the upper end of the convex guide surface.

4. An automatic positioning system as in claim 3, wherein said arcuate aperture is provided with a grommet.

5. An automatic positioning system as in claim 4, wherein said mounting plate is provided with a slit connecting an outer edge of the mounting plate to said arcuate aperture, and wherein said grommet is provided with a slit in a position corresponding to the slit in the mounting plate when installed, such that a seat belt webbing can be passed through said mounting plate slit and grommet slit into said arcuate aperture.

6. A vehicle safety belt shoulder harness mounting plate comprising:

a mounting plate adapted for mounting on or near the roof of a vehicle, apertures for mounting a retractor mechanism on said mounting plate, a convex guide surface over which said shoulder harness is fed during deployment, said convex guide surface being positioned relative to said retractor mechanism and said seat belt buckle such that during deployment of said safety belt the movement of said safety belt tongue plate over a first, lower path causes the shoulder harness to be deployed from the lower end of the convex guide surface, and movement of the safety belt tongue plate over a second, higher path causes the shoulder harness to be deployed from the upper end of the convex guide surface.

7. A vehicle safety belt shoulder harness mounting plate as in claim 6, wherein said guide plate is further provided with a concave surface opposing said convex guide surface and defining an arcuate aperture in said guide plate, said arcuate aperture having an upper end and a lower end.

8. A vehicle including a safety belt shoulder harness automatic positioning system, said vehicle including an automobile frame including floor frame rails, uprights, interior wall panels and exterior body panels mounted on said uprights, a roof support frame rail, a vehicle interior floor, and a passenger seat mounted on said floor, said safety belt shoulder harness automatic positioning system comprising:

a mounting plate mounted on said roof support frame rail, a safety belt retractor mechanism mounted on said mounting plate such that said safety belt retractor mechanism is mounted under said roof support rail and between one of said interior wall panel and one of said exterior body panel, a safety belt attached at one end on or near the vehicle interior floor and at another end to said safety belt retractor mechanism, a seat belt buckle mounted to the vehicle, and an adjustable tongue plate provided on said safety belt, said tongue plate adapted for locking engagement with said seat belt buckle, the segment of the seat belt above the tongue plate forming the shoulder harness segment of the seat belt, wherein said mounting plate is provided with a convex guide surface over which said shoulder harness is fed during deployment, a concave surface opposing said convex guide surface and defining an arcuate aperture in said guide plate, said arcuate aperture having an upper end and a lower end, said arcuate aperture being positioned relative to said retractor mechanism and said seat belt buckle such that during deployment of said safety belt the movement of said safety belt tongue plate over a first, lower path causes the shoulder harness to be deployed from the lower end of the convex guide surface, and movement of the safety belt tongue plate over a second, higher path causes the shoulder harness to be deployed from the upper end of the convex guide surface, wherein a plastic grommet is provided around the periphery of said arcuate aperture, and wherein said mounting plate and safety belt retractor are disposed between said interior wall and exterior body panel such that they are hidden from view and such that only the safety belt webbing protrudes from said grommet.

* * * * *